J. F. HAMMOND.
FOOT CONTROLLER FOR ELECTRIC MOTORS.
APPLICATION FILED SEPT. 23, 1908.
969,055.
Patented Aug. 30, 1910.
2 SHEETS—SHEET 1.
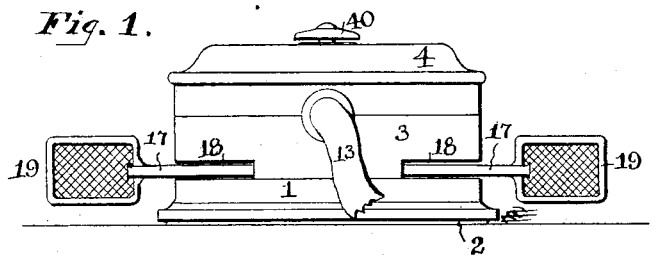
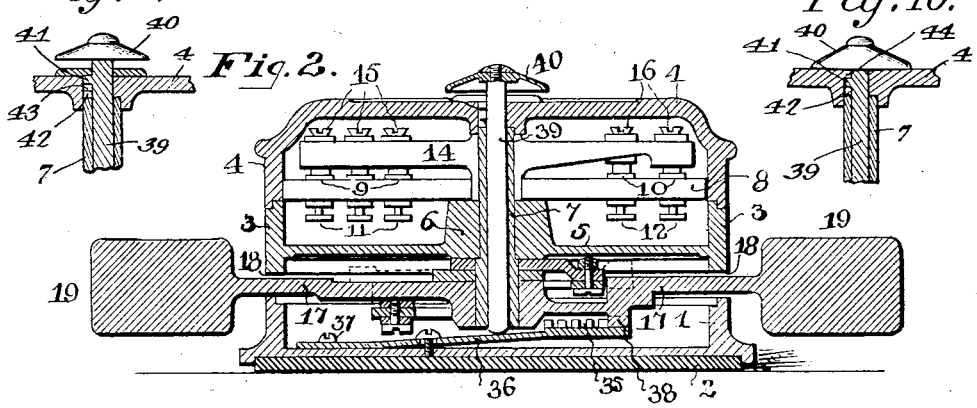
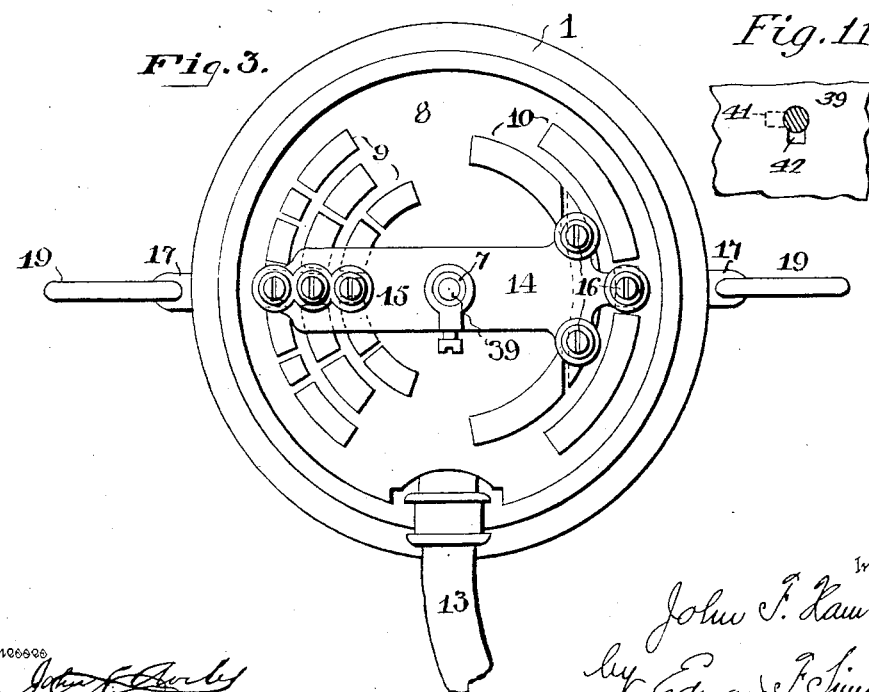
Inventor
John F. Hammond
by Edward F. Simpson, Jr.
Attorney
Witnesses J. F. HAMMOND.
FOOT CONTROLLER FOR ELECTRIC MOTORS.
APPLICATION FILED SEPT. 23, 1908.
969,055.
Patented Aug. 30, 1910.
2 SHEETS—SHEET 2.
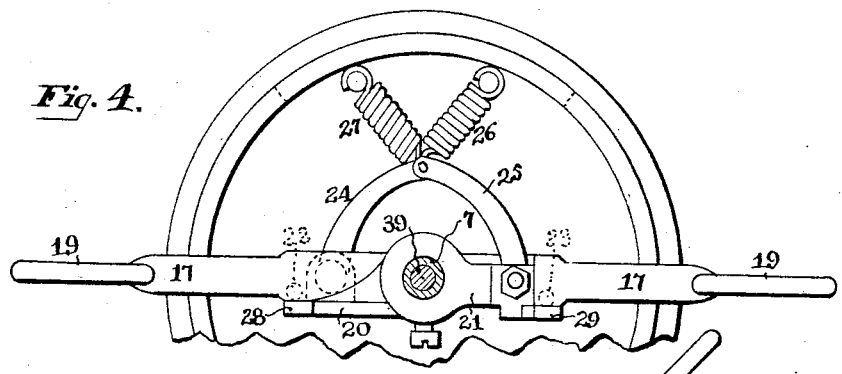
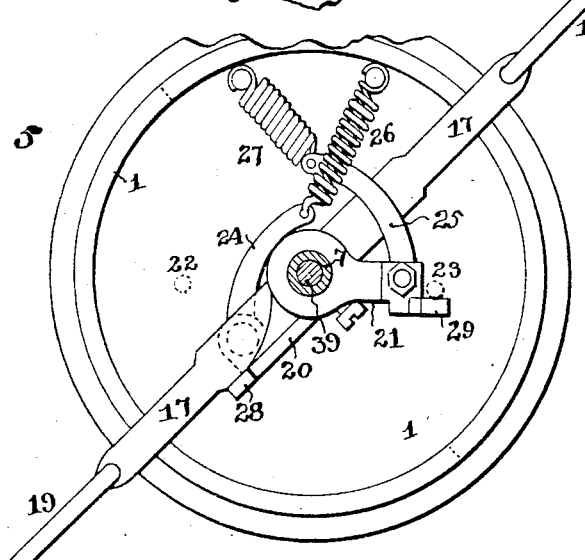
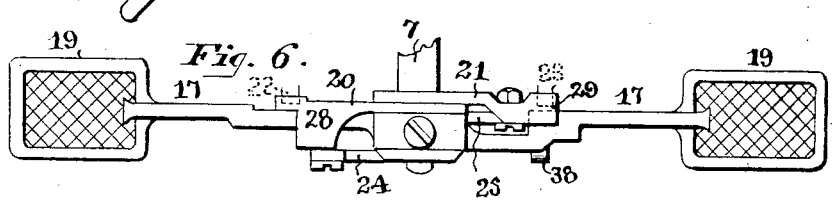
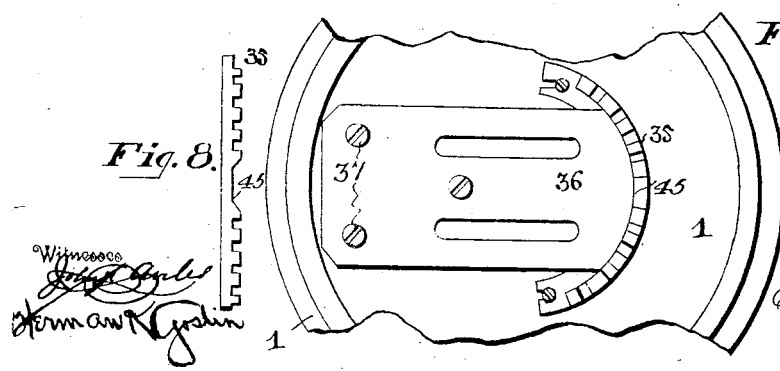

UNITED STATES PATENT OFFICE.

JOHN F. HAMMOND, OF PRINCE BAY, NEW YORK, ASSIGNOR TO THE S. S. WHITE DENTAL MFG. CO., OF PHILADELPHIA, PENNSYLVANIA.

FOOT-CONTROLLER FOR ELECTRIC MOTORS.

969,055.   Specification of Letters Patent.   Patented Aug. 30, 1910.

Application filed September 23, 1908. Serial No. 454,433.

*To all whom it may concern:*

Be it known that I, JOHN F. HAMMOND, a citizen of the United States, residing at Prince Bay, in the county of Richmond and State of New York, have invented certain new and useful Improvements in Foot-Controllers for Electric Motors; and I do hereby declare the following to be a full, clear, and exact description of the invention, such as will enable others skilled in the art to which it appertains to make and use the same.

My invention relates to a foot controller for electric motors particularly designed for operating dental engines, etc.

The object of my invention is to improve that class of controllers which are adapted to be placed on the floor and which are provided with a foot-actuated lever or pedal by means of which the motor may be started and stopped, its speed controlled, and the direction of rotation be reversed.

The invention consists in the improvements indicated in the accompanying drawings, described in the following specification and pointed out in the claims at the conclusion of said specification.

In said drawings Figure 1 is a view in side elevation of a foot controller embodying my invention. Fig. 2 is a central vertical sectional view with some parts in elevation. Fig. 3 is a plan view with the top section of the case removed. Fig. 4 is a plan view of the operating lever and tension springs, the lever being in normal central position. Fig. 5 is a similar view showing the operating lever moved to its extreme position to one side of its central position. Fig. 6 is a view in side elevation of said operating lever. Fig. 7 is a plan view of the rack and detent device, and Fig. 8 is an end view of said rack. Fig. 9 is a partial vertical sectional view showing the trip-rod in its upper or normal position. Fig. 10 is a view similar to Fig. 9, but the section taken at an angle thereto and showing the trip-rod depressed. Fig. 11 is a top or plan view of a portion of the controller box with the trip-rod disk or knob omitted.

The controller case or box, which is cylindrical in horizontal section and adapted to rest on the floor, is shown as consisting of three sections, *i. e.* a base section 1 preferably provided on its under side with a soft rubber or felt disk 2, a middle section 3, and a top section 4. The middle section 3 is formed with a disk 5 provided with a central bearing 6 in which is supported a vertical shaft 7. A plate 8 of slate or other insulating material is supported above the disk 5 and on it are mounted fixed contacts as indicated in Figs. 2 and 3. These contacts are arranged concentrically around the shaft 7 in two groups 9 and 10 opposite each other on the top of the plate 8. The contacts of each group are respectively connected with two groups of binding posts 11 and 12 on the underside of the plate 8 and to these binding posts are attached conducting wires (not shown) leading to a rheostat. In the present embodiment of my invention the rheostat is not located in the case but outside thereof. Hence the conductors pass outside the case in the form of a cable 13.

Each group of fixed contacts extends on opposite sides of a line drawn through the center of the shaft 7, the middle contacts of each group, which are the neutral contacts, being on this central line.

Fixed to the vertical shaft 7 above the fixed contact plate 8 and extending on opposite sides of said shaft is a horizontally movable controller arm 14 carrying two groups of spring contacts 15 and 16 for co-acting respectively with the two groups of fixed contacts 9 and 10. A horizontally movable operating lever 17 is fixed to said shaft below the disk 5, and, like the controller arm 14 extends on opposite sides of said shaft. Preferably the opposite ends of the operating lever project through openings 18 18 in the side of the case, the ends of said lever being provided with pedals 19 19 by means of which the lever and consequently the controller arm 14 may be moved horizontally by the foot of the operator.

Without further describing the electrical contacts and connections, which form no part of my present invention, suffice it to say that these contacts and connections should be such as to accomplish the following results: Normally the controller arm 14 occupies a central position with its spring contacts resting upon the neutral central contacts of the fixed contacts, in which position the motor is at rest. Movement of the controller arm to the right of the central line onto the first row of the fixed contacts starts the motor in one direction at slowest speed. Continued movement of the controller arm in this direction onto progressive contacts increases the speed of the motor until the limit of movement in this direction is reached, when the motor is running at full speed. The motor is reversed or operated in the opposite direction by moving the controller arm to the left of the median line, the contacts on one side of this line being precisely the same as those on the other side except as to the direction in which the motor is run. To stop the motor the controller arm is returned to center.

Means for returning the controller arm 14 to its central position are as follows: A pair of arms 20 and 21 loosely turning about the vertical shaft 7 to which the controller arm 14 and operating lever 17 are affixed, extend in diametrically opposite directions from said shaft, and normally rest against fixed stops 22 and 23 respectively. To the arm 20 is pivoted a link 24 and to the arm 21 a link 25, springs 26 and 27 being connected to the outer ends of the respective links and also to the controller box. When the arms 20 and 21 rest against the fixed stops 22 and 23, the operating lever bears against stops 28 and 29 carried respectively by said arms 20 and 21, the operating lever and controller arm thus being held in central position. The springs 26 and 27, it will be seen, are located diagonally to the movement of the operating lever, the springs and arms to which they are connected crossing each other. In order that the springs and arms may thus cross each other without interference they must be in different vertical planes. This may be accomplished by pivoting the link 24 to the arm 20 beneath the operating lever 17, while the other link 25 is pivoted to the arm 21 above said operating lever, the latter being suitably formed for this arrangement. The links 24 and 25 should be suitably curved as shown, to avoid coming in contact with the hub of the operating lever.

The springs 26 and 27 exert equal tension upon the operating lever on opposite sides of its center, thus normally holding said lever in its central position, which is determined by the fixed stops 22, 23. When the lever is moved in one direction, say to the right of the central position, it moves the arm 20 in the same direction, against the tension of spring 26. Since the other arm 21 abuts against the fixed stop 23 the operating lever moves away from said arm, thus rendering the spring 27 inactive during movement of the operating lever in this direction. Upon releasing the operating lever the spring 26 pulls it back to center. When said lever is moved to the left of center the other spring 27 comes into play, leaving the first mentioned spring 26 inert. If the operating lever, after being moved to one side or the other of its central position, is suddenly released, the spring against which it is pulling immediately returns it to center, where instead of coming to a sudden stop it oscillates slightly before coming to rest. This oscillation is due to the momentum of the lever carrying it past the center, first in one direction and then in the other, alternately against the tension of the respective springs, both of which act as buffers to bring the lever to rest.

By disposing the springs 26 27 diagonally instead of at a right angle to the movement of the operating lever, the tension of the springs is of equal resistance throughout the entire movement of the lever. By this means the lever may be easily moved by the operator for controlling the motor.

In the mechanism thus far described the operating lever 14 when released by the foot of the operator instantly returns to central position, whereby the motor is automatically stopped. At times it is desirable to hold the lever in any position to which it may be moved after the operator's foot has been removed and I have therefore provided the following means for this purpose. A curved rack 35 carried by a plate spring 36 fastened at 37 to the bottom of the controller box has a tendency to press upwardly and engage a detent 38 (see Figs. 2, 6, 7 and 8) projecting from the under side of the operating lever 17. The shaft 7 to which the operating lever 17 and controller arm 14 are secured is tubular and passing through it is a vertical trip rod 39, the lower end of which rests loosely upon the rack plate 36 and the upper end of which projects above the top of the controller box. To the upper end of the trip rod 39 is best secured a disk or knob 40 by means of which the rod may be more readily manipulated.

Owing to the presence of the rack and detent the operating lever remains in any position to which it may be moved either to the right or left of its central position after the operator has removed his foot from the lever. The operator may return the lever to central position for stopping the motor either by positively moving said lever with his foot or by pressing his foot upon the trip rod 39. Either of these movements releases the detent 38 of the operating lever from the rack 35 and permits said lever to come under the influence of one or other of the springs 26, 27, as before explained. The first named movement is made possible by rounding the detent, as indicated in Fig. 6, by beveling the sides of the center notch 45 of the rack, as indicated in Fig. 8, and by making said notch of a considerably greater width than the detent. In this way the detent may be moved out of the center notch of the rack when positive lateral pressure is brought to bear directly upon the operating lever, and when once out of said center notch the detent under the influence of the spring 26 or 27 will not engage in the side notches of the rack. The latter movement,—*i. e.* pressure of the operator's foot upon the trip-rod 39,—forces the rack 35 from the detent 38.

For the purpose of providing a motor controller in which the detent for holding the operating lever in any desired position may be thrown into or out of action at the will of the operator without necessitating the insertion or removal of parts, and which change can be effected quickly and with the least amount of trouble, I have provided means for temporarily locking the trip-rod 39 in its depressed position so that until it is positively released from this position the rack 35 will be out of action and the operating lever permitted to automatically return to center when released. This means may consist, as shown in Figs. 9, 10 and 11, of a bayonet-joint connection constructed as follows:—The trip-rod 39 is formed with a side lug 41 movable up and down in a vertical slot 42 in the top of the controller box through which said rod passes. A cross slot 43 opens into the bottom of the vertical slot, thus forming a shoulder 44 by the side of the vertical slot. When the trip-rod is depressed to throw the rack out of engagement with the detent, the lug 41 is opposite the cross slot 43 and the trip-rod may be turned to bring said lug 41 under the shoulder 44 (see Fig. 10). Thus, by simply pressing upon the trip-rod and giving it a slight turn, the rack 35 will be depressed and permanently held out of engagement with the detent 38 until the trip rod is positively actuated to permit the rack to again engage the detent. When the detent is thus held out of action it is eliminated entirely for the time being and the controller acts the same as it would were no detent provided. That is to say, the operating lever remains in a given position only so long as it is held there by the operator's foot, but the instant it is released it is automatically returned to center. Should the operator desire to use the detent he has only to turn the trip rod until the lug 41 clears the shoulder 43, this movement permitting the rack to engage the detent and forcing the trip rod upwardly to its farthest limit where it is in position to be pressed upon for releasing the detent when desired.

I claim as my invention:—

1. In an electric motor controller the combination of a case, fixed contacts therein, a shaft, a controller arm connected to said shaft and carrying contacts movable over said fixed contacts, an operating lever connected to said shaft and extending from opposite sides thereof, two spring actuated arms projecting in opposite directions from and turning independently about said shaft, said arms bearing upon the side of said operating lever, and stops against which said arms normally abut for holding the operating lever in central position.

2. In an electric motor controller the combination of a case, fixed contacts therein, a shaft, a controller arm connected to said shaft and carrying contacts movable over said fixed contacts, an operating lever connected to said shaft and extending from opposite sides thereof, two arms projecting in opposite directions from and turning independently about said shaft, said arms bearing upon the side of said operating lever, stops against which said arms normally abut for holding the operating lever in central position, and springs for independently drawing said arms against said stops.

3. In an electric motor controller the combination of a case, fixed contacts therein, a shaft, a controller arm connected to said shaft and carrying contacts movable over said fixed contacts, an operating lever connected to said shaft and extending from opposite sides thereof, two arms projecting in opposite directions from and turning independently about said shaft, said arms bearing upon the side of said operating lever, stops against which said arms normally abut for holding the operating lever in central position, and springs for independently drawing said arms against said stops, said springs being disposed diagonally to the movement of said operating lever.

4. In an electric motor controller the combination of a case, fixed contacts therein, a shaft, a controller arm connected to said shaft and carrying contacts movable over said fixed contacts, an operating lever connected to said shaft and extending from opposite sides thereof, two arms projecting in opposite directions from and turning independently about said shaft, said arms bearing upon the side of said operating lever, stops against which said arms normally abut for holding the operating lever in central position, a link pivoted to each of said arms, and springs connecting said links with the case.

5. In an electric motor controller the combination of a case, fixed contacts therein, a shaft, a controller arm connected to said shaft and carrying contacts movable over said fixed contacts, an operating lever connected to said shaft, means for drawing said operating lever to a central position, a detent device for holding said operating lever in any position to which it may be moved to one side or the other of said central position and which will permit said lever to be moved to center by direct application of external pressure, and means for tripping said detent device for releasing said operating lever without applying direct pressure to said operating lever, whereby said lever may be returned to its central position either by applying external pressure directly to it or by actuating said means for tripping said detent.

6. In an electric motor controller the combination of a case, fixed contacts therein, a shaft, a controller arm connected to said shaft and carrying contacts movable over said fixed contacts, an operating lever connected to said shaft, means for drawing said operating lever to a central position, a detent device for holding said operating lever in any position to which it may be moved to one side or the other of said central position and which will permit said lever to be moved to center by external pressure applied thereto, a trip rod by means of which said detent device may be tripped for releasing said operating lever, and means for holding said trip rod in a position to render said detent device inoperative.

7. In an electric motor controller the combination of a case, fixed contacts therein, a tubular shaft, a controller arm connected to said shaft and carrying contacts movable over said fixed contacts, an operating lever also connected to said shaft, means for drawing said operating lever to a central position, a detent device for holding said operating lever in any position to which it may be moved to one side or the other of said central position, and a trip rod in said tubular shaft resting upon said detent device and projecting above the top of the case, whereby pressure upon said rod trips said detent device and releases said operating lever.

8. In an electric motor controller the combination of a case, fixed contacts therein, a tubular shaft, a controller arm connected to said shaft and carrying contacts movable over said fixed contacts, an operating lever also connected to said shaft, means for drawing said operating lever to a central position, a detent device for holding said operating lever in any position to which it may be moved to one side or the other of said central position, a trip rod in said tubular shaft resting upon said detent device and projecting above the top of the case, whereby pressure upon said rod trips said detent device and releases said operating lever, and means for holding said trip rod in a position to render said detent device inoperative.

In testimony whereof I affix my signature in presence of two witnesses.

JOHN F. HAMMOND.

Witnesses:
F. C. E. PETERSEN,
SAMUEL R. BARTON.